R. E. PORTERFIELD.
GUARD ATTACHMENT FOR HARVESTERS AND THE LIKE.
APPLICATION FILED OCT. 12, 1917.

1,277,257.

Patented Aug. 27, 1918.
2 SHEETS—SHEET 1.

Witnesses

Inventor
R. E. Porterfield
By
D. Swift & Co.
Attorneys

R. E. PORTERFIELD.
GUARD ATTACHMENT FOR HARVESTERS AND THE LIKE.
APPLICATION FILED OCT. 12, 1917.
1,277,257.
Patented Aug. 27, 1918.
2 SHEETS—SHEET 2.
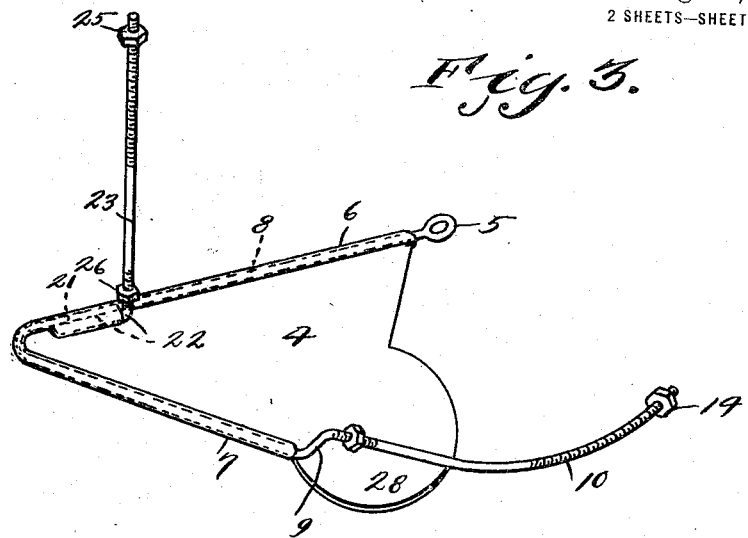
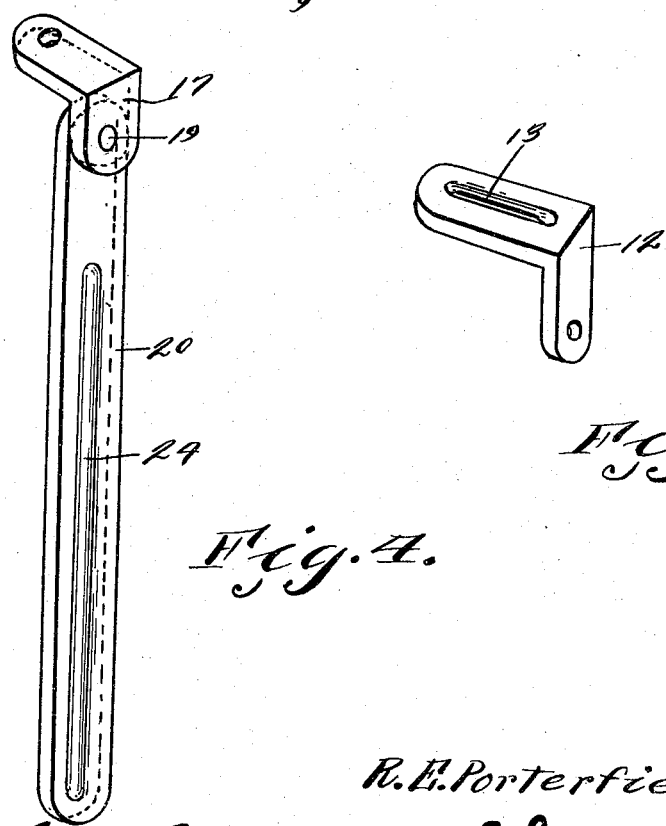
Witnesses
Inventor
R. E. Porterfield
Attorneys

UNITED STATES PATENT OFFICE.

RALPH E. PORTERFIELD, OF INDEPENDENCE, OREGON.

GUARD ATTACHMENT FOR HARVESTERS AND THE LIKE.

1,277,257.  Specification of Letters Patent.  Patented Aug. 27, 1918.

Application filed October 12, 1917. Serial No. 196,154.

*To all whom it may concern:*

Be it known that I, RALPH E. PORTERFIELD, a citizen of the United States, residing at Independence, in the county of Polk, State of Oregon, have invented a new and useful Guard Attachment for Harvesters and the like; and I do hereby declare the following to be a full, clear, and exact description of the invention, such as will enable others skilled in the art to which it appertains to make and use the same.

This invention relates to an improved guard for harvesters and the like, and one of the objects of the invention is to provide an attachment of this kind, to be arranged adjacent either end of the cutting mechanism of the harvester, whereby, should any obstacles or rough ground or the like come in contact therewith when turning or moving straight ahead, the guard will ride thereover and yield either upwardly and laterally, and then automatically resume its normal position, and at the same time tend to guide the cutting mechanism over or past the obstructing obstacle.

A further object of the invention is the provision of a simple, efficient and practical device of this kind, which may be readily manufactured for a small cost and sold at a reasonable profit.

In practical fields, the details of construction may necessitate alterations falling within the scope of what is claimed.

The invention comprises further features and combination of parts, as hereinafter set forth, shown in the drawings and claimed.

In the drawings:—

Fig. 3 is an enlarged detail perspective view of the guard attachment removed.

Fig. 4 is a detail perspective view of one of the pivoted slotted guide arms.

Fig. 5 is an enlarged detail perspective view of a guide bracket.

Figure 1:
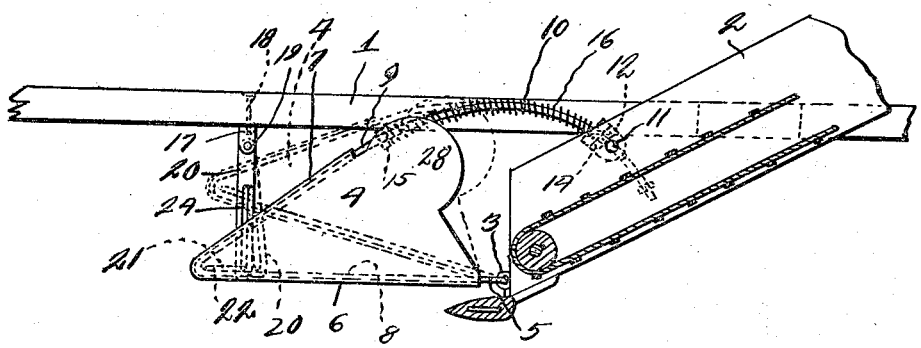
Figure 1 is a sectional view of a portion of a harvesting machine, showing the improved guard attachment applied thereto.
Figure 2:
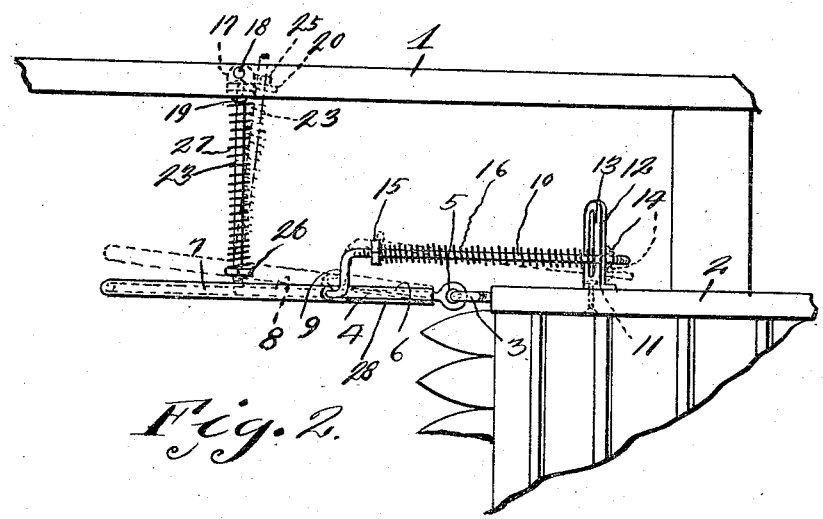
Fig. 2 is a plan view of Fig. 1 also showing the guard attachment.

Referring more especially to the drawings, 1 designates the tongue or pole of the harvesting machine, which may be connected in any suitable manner to the side 2 of the frame of the machine, which side, at its forward edge has an eye 3, adjacent one end of the cutting mechanism. The guard attachment 4 has an eye 5, which is connected to the eye 3. This guard may be any suitable shape or configuration, and may be constructed of any suitable material, preferably sheet metal. Preferably the guard is constructed substantially triangular in shape, and has its lower or forward and upper edge portions rolled to form hollow beads 6 and 7, for the reception of a substantially triangular shaped frame 8, thereby insuring firmness or rigidity, as well as strengthening the entire guard. This triangular frame is constructed from a single length of heavy wire or of rod material, and the lower arm of the frame terminates in the eye 5. However, the upper rod of the frame has a lateral portion 9, which terminates in a curved part 10, which is curved on a radius using the connections between the eyes 3 and 5 as a center. Secured in any suitable manner, as at 11, to the side 2 of the frame, is a bracket 12, having a slot 13, through which the curved part 10 of the frame of the guard extends, there being a nut 14 threaded on the extremity of the curved part 10. A suitable nut or collar 15 is threaded on the curved part 10, and interposed between said nut or collar 15 and said bracket, is a coiled spring 16, the tension of which may be regulated by adjusting the nut or collar 15. An angle plate or bracket 17 is secured at 18 to the tongue or pole 1, and pivoted at 19 to the downwardly extending arm of said bracket or plate, is a slotted extension arm 20. Soldered or otherwise securely fastened as at 21 to the outer face of the guard, is the angle end 22 of a rod 23, which passes through the slot 24 of the extension arm 20. A nut 25 is threaded on the rod 23 adjacent the exterior outer face of the arm 20. A second nut 26 is threaded on the rod 23 adjacent the angle end thereof, which is secured to the guard, and interposed between the nut 26 and the inner face of the arm 20 is a coil spring 27. By adjusting the nut 26, the tension of the spring 27 may be regulated. The guard in passing over an obstruction, will yield upwardly, and should it contact with an obstruction, when the machine is turning, the guard will yield laterally and outwardly, or outwardly and upwardly, and in each instance, just so soon as the obstruction is passed, the guard will automatically resume its normal position. The upper rear part of the guard is provided with a semi-circular extension 28, which may be varied in length and shape, if so desired.

The invention having been set forth, what is claimed as new and useful is:—

1. In combination with a harvester machine, having a slotted bracket carried by one side of the frame of the machine, and a slotted extension arm pivoted to the tongue of the machine, a guard vertically arranged and pivoted to the frame of the machine adjacent one end of the cutting mechanism, said guard having a curved rod extending from its upper part rearwardly and downwardly and through the slot of the bracket, a nut thereon adjacent the guard, a spring interposed between the nut and the bracket, means on the extremity of said rod and engaging the bracket to prevent disengagement of the rod, said guard having a laterally extending rod passing through the slot of the extension arm, a nut on the second rod adjacent the sides of the guard, and a coiled spring on the lateral arm between the extension arm and the second nut, and means on the extremity of the second rod adjacent the extension arm to retain the second rod in place.

2. A guard for a harvesting machine constructed of sheet metal and being substantially triangular in shape, an acute angle shaped rod frame to the acute angled sides of which, the upper and lower edge portions of the triangular sheet metal guard are fixed, the lower rod of the frame terminating in an eye at its rear end, said eye being pivotally connected to the frame of the harvester, the upper rod of the frame of the guard having a yielding connection with the frame of the harvester, and a yielding connection between the side of the guard and the tongue of the harvester.

In testimony whereof I have signed my name to this specification in the presence of two subscribing witnesses.

RALPH E. PORTERFIELD.

Witnesses:
B. F. SWOPE,
L. E. BARRICK.

Copies of this patent may be obtained for five cents each, by addressing the "Commissioner of Patents, Washington, D. C."